(12) United States Patent
Huang et al.

(10) Patent No.: US 7,933,333 B2
(45) Date of Patent: Apr. 26, 2011

(54) METHOD AND APPARATUS FOR DETECTING MOTION IN MPEG VIDEO STREAMS

(75) Inventors: Chien-Min Huang, Clovis, CA (US); Farzin Aghdasi, Clovis, CA (US)

(73) Assignee: Pelco, Inc, Clovis, CA (US)

( * ) Notice: Subject to any disclaimer, the term of this patent is extended or adjusted under 35 U.S.C. 154(b) by 1700 days.

(21) Appl. No.: 11/172,403

(22) Filed: Jun. 30, 2005

(65) Prior Publication Data
US 2006/0210175 A1 Sep. 21, 2006

Related U.S. Application Data

(60) Provisional application No. 60/584,080, filed on Jun. 30, 2004.

(51) Int. Cl.
*H04N 7/12* (2006.01)
*G06K 9/00* (2006.01)
(52) U.S. Cl. .................... 375/240.16; 382/103
(58) Field of Classification Search ............. 348/143, 348/135, 155, 142, 152, 154, 171, 172; 382/103, 382/276, 107, 236
See application file for complete search history.

(56) References Cited

U.S. PATENT DOCUMENTS

| 5,659,364 | A | 8/1997 | Aoki et al. | |
| 5,969,755 | A * | 10/1999 | Courtney | 348/143 |
| 6,600,872 | B1 | 7/2003 | Yamamoto | |
| 2001/0046309 | A1 * | 11/2001 | Kamei | 382/103 |
| 2002/0104094 | A1 | 8/2002 | Alexander et al. | |
| 2003/0133511 | A1 | 7/2003 | Cabasson et al. | |
| 2003/0194110 | A1 | 10/2003 | Brodsky | |
| 2004/0086152 | A1 * | 5/2004 | Kakarala et al. | 382/103 |

FOREIGN PATENT DOCUMENTS

| EP | 1 173 020 | 1/2002 |
| EP | 1173020 | 1/2002 |
| JP | 6105312 | 4/1994 |
| JP | 9205640 | 8/1997 |
| WO | WO 03079663 | 9/2003 |

OTHER PUBLICATIONS

Courtney, J.D.: "Automatic Video Indexing Via Object Motion Analysis" Pattern Recognition, Elsevier, Kidlington, GB, vol. 30, No. 4, Apr. 1997; pp. 607-625.

* cited by examiner

*Primary Examiner* — Behrooz Senfi

(57) ABSTRACT

A method of detecting motion in a video image comprising the steps of connecting an MPEG compliant encoder to a video source that provides video images, compressing the video data in the video images and generating a compressed video image bit stream having a motion compensation component, receiving the generated compressed video image bit stream, comparing the motion compensation component to a threshold value, and indicating that motion has occurred if the motion compensation component is greater than the threshold value.

8 Claims, 5 Drawing Sheets

METHOD AND APPARATUS FOR DETECTING MOTION IN MPEG VIDEO STREAMS

CROSS-REFERENCE TO RELATED APPLICATION

This application claims the benefit of U.S. Provisional Application No. 60/584,080, entitled MOTION DETECTION, MISSING OBJECT AND ABANDONED OBJECT IN WIS CHIP, and filed on Jun. 30, 2004. U.S. Provisional Application No. 60/584,080 is hereby incorporated by reference.

STATEMENT REGARDING FEDERALLY SPONSORED RESEARCH OR DEVELOPMENT

N/A

BACKGROUND OF THE INVENTION

This invention relates to video surveillance and, in particular, to an apparatus and method of storing video data in a video surveillance system.

In today's security systems typically one or more guards monitor a series of cameras, looking for situations that are not part of the normally expected scenes. In many cases, the abnormal activities involve motion such as people running, cars speeding, erratic behavior of people, and so forth. With the recent newspaper accounts of terrorist bombings, security attention has expanded to include objects that may be abandoned in public places such as airports or cafes. An abandoned object is a potential threat that needs to be detected and addressed as quickly as possible. In addition, theft of property from unattended venues is another important task for today's security systems and security personnel. In this case, the removal of an object of value must be detected quickly if the unauthorized removal is to be prevented. All of these tasks are extremely difficult to visually monitor for long periods of time. Some prior art digital video recorders have been provided with software to analyze recorded video to detect abandonment or removal of an object; however, these analyses are generally not done in real-time. Moreover, with the large numbers of cameras that are typically monitored by security personnel, a centralized device such as a digital video recorder or other computing system cannot practically handle the volume of video data that has to be analyzed. Accordingly, there has been a long felt need for an economical way to detect motion, object abandonment and object removal in real-time.

SUMMARY OF THE INVENTION

In accordance with the present invention there is provided a method of detecting motion in a video image comprising the steps of connecting an MPEG compliant encoder to a video source that provides video images, compressing the video data in the video images and generating a compressed video image bit stream having a motion compensation component, receiving the generated compressed video image bit stream, comparing the motion compensation component to a threshold value and indicating that motion has occurred if the motion compensation component is greater than the threshold value.

In accordance with the present invention there is also provided a method of detecting an abandoned object in a video image comprising the steps of connecting an MPEG compliant encoder to a video source that provides video images, storing a reference video frame, obtaining the current video image frame, determining the motion compensation for the current video image frame versus the reference video frame, comparing the motion compensation to a threshold value, compressing the current video image, and storing an indication in the compressed video image that an abandoned object has been detected if the motion compensation is greater than the threshold value.

In a further aspect of the present invention there is provided a method of detecting the removal of an object in a video image comprising the steps of connecting an MPEG compliant encoder to a video source that provides video images, storing a reference video frame containing an object to be monitored, defining a zone of interest around the object to be monitored, obtaining the current video image frame, determining the motion compensation for the current video image frame in the zone of interest versus the reference video frame zone of interest, comparing the motion compensation to a threshold value, compressing the current video image, and storing an indication in the compressed video image that the removal of the object to be monitored has been detected if the motion compensation is greater than the threshold value.

In another aspect of the present invention there is provided an apparatus for detecting motion in a video image comprising an encoder adapted to be connected to a video image source, the encoder providing compressed video images including an MPEG compliant motion compensation between two video images, and a comparator connected to the encoder for comparing the motion compensation with a predetermined threshold to determine if the motion compensation is greater than the predetermined threshold, the comparator providing an indication if the motion compensation is greater than the predetermined threshold.

In still another aspect of the present invention there is provided an apparatus for detecting an abandoned object in a video image comprising an encoder adapted to be connected to a video image source, the encoder providing compressed video images including an MPEG compliant motion compensation between two video images and comprising a first memory for storing the current video image frame and a processor, a second memory for storing a reference video image, the processor determining the motion compensation for the current video image stored in the memory with the reference video image stored in the second memory, comparing the motion compensation with a threshold value, and providing an indication in the compressed image for the current frame that an abandoned object has been detected if the motion compensation is greater than the threshold value.

In yet another aspect of the present invention there is provided an apparatus for detecting the removal of an object in a video image comprising an encoder adapted to be connected to a video image source, the encoder providing compressed video images including an MPEG compliant motion compensation between two video images and comprising a first memory for storing the current video image frame and a processor, a second memory for storing a reference video image containing an object to be monitored, the processor being adapted to allow a zone of interest to be defined around the object in the reference image and determining the motion compensation for the zone of interest in the current video image stored in the first memory with the zone of interest in the reference video image stored in the second memory, comparing the motion compensation with a threshold value, and providing an indication in the compressed image for the current frame that the removal of the object has been detected if the motion compensation is greater than the threshold value.

The present invention provides a method and apparatus to detect motion, object abandonment, and object removal in real-time in MPEG compliant systems. It does not require additional circuitry, such as a field programmable gate array, and provides a less expensive, more compact system that requires less processing time. In alternative embodiments, the motion compensation can be the motion vector in the MPEG standard bitstream. In other embodiments, motion compensation can be a motion vector or sum of the absolute values of the distortion between the two frames or both stored in the meta-data portion of the MPEG standard bitstream. As used herein frame means an entire video frame or a portion of a video frame including only a portion of the blocks comprising the video image.

Other advantages and applications of the present invention will be made apparent by the following detailed description of the preferred embodiment of the invention.

DETAILED DESCRIPTION OF THE INVENTION

Figure 1:
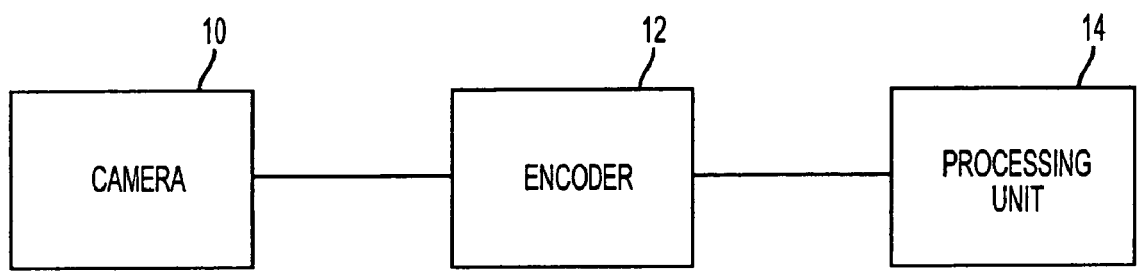
FIG. 1 is a block diagram illustrating one embodiment of the present invention.

MPEG video coding standards for moving pictures, such as MPEG-1, MPEG-2, and MPEG-4 predict the picture content from past reconstructed images before coding, and only the differences from the reconstructed pictures, and any extra information needed to perform the prediction, are coded. The MPEG standards specify the bitstream format generated by the encoder for the compressed video image. This standard bitstream is then decoded by a decoder to recreate the original video image from the compressed image. An MPEG stream normally consists of a series of data frames encoding pictures. The three types of data frames are I-frames, P-frames, and B-frames. I-frames are encoded as a single image with no reference to any past or future frames. P-frames (predictive) are encoded relative to the past reference frame, which can be a P-frame or I-frame. The past reference frame is the closest preceding reference frame. B-frames (bidirectional predictive) are encoded relative to the past reference frame, the future reference frame, or both frames. The future reference frame is the closest following reference frame, either I-frame or P-frame. The series of frames, which is referred to in the art as a Group of Pictures (GOP), can take many different configurations. The ratio of I-frames, P-frames, and B-frames is determined by the nature of the video stream, the bandwidth constraints of the network and system, and the time required for encoding the video stream. The I-frame may be encoded directly, but the P-frames and B-frames are subjected to a motion compensation process. The P-frames and B-frames are encoded for temporal redundancy. Each macroblock in a P-frame or B-frame is associated with an area in the previous or next frame that is well correlated with it by the encoder. The encoder uses a motion vector that maps the macroblocks to its correlated area. Motion compensation is used to predict the values of pixels by relocating a block of pixels from the last picture. This motion is described by a two-dimensional vector or movement from its last position. This motion vector and the difference between the two areas are then encoded.

There are a number of chips commercially available encoder chips, such as the GO7007SB streaming media encoder chip available from WISchip International Ltd., that can compress raw digital video into MPEG-4 or MPEG-2 formats. The video compression is achieved by removing spatial and temporal redundancy. In order to remove temporal redundancy, a process, called motion compensation, is performed. In this process, each incoming image is partitioned into blocks of 16×16 or 8×8. A best match for each block is found from the previous frame. Temporal redundancy is reduced by using the best match block in the previous frame to represent the block in the current frame. The process of motion compensation is to find the best match for each block in the current frame by searching through certain range of area in the previous frame. The sum of absolute distortion between the block in the current frame and the blocks in the previous frame are computed. The one with the minimum distortion is the best match. In one embodiment of the present invention, the motion vector that is stored in the standard MPEG bitstream by an MPEG compliant encoder chip is used to detect motion in the video frame. In another embodiment, an MPEG compliant encoder chip is modified, such as in its firmware, to provide either the motion vector or the sum of absolute values of distortion between the frames or both and store them in the meta-data portion of the syntax.

FIG. 1 illustrates one embodiment of the present invention. A camera 10 is connected to encoder 12, which is an industry standard MPEG encoder chip providing the motion vector for the frame or a modified MPEG encoder chip providing the motion vector and the sum of absolute values of the distortion between the frames in the meta-data portion of the bit stream. Encoder 12 is connected to processing unit 14, which can be a security system central processor, user personal computer logged into a network, digital recorder and so forth. Processing unit 14 can be connected to encoder 12 by a closed network, local area network or wide area network, such as the Internet. Processing unit 14 can have software, firmware, or hardware to implement the techniques of the present invention. Encoder 12 receives video images from camera 10 and compresses them according to MPEG standards.

Figure 2:
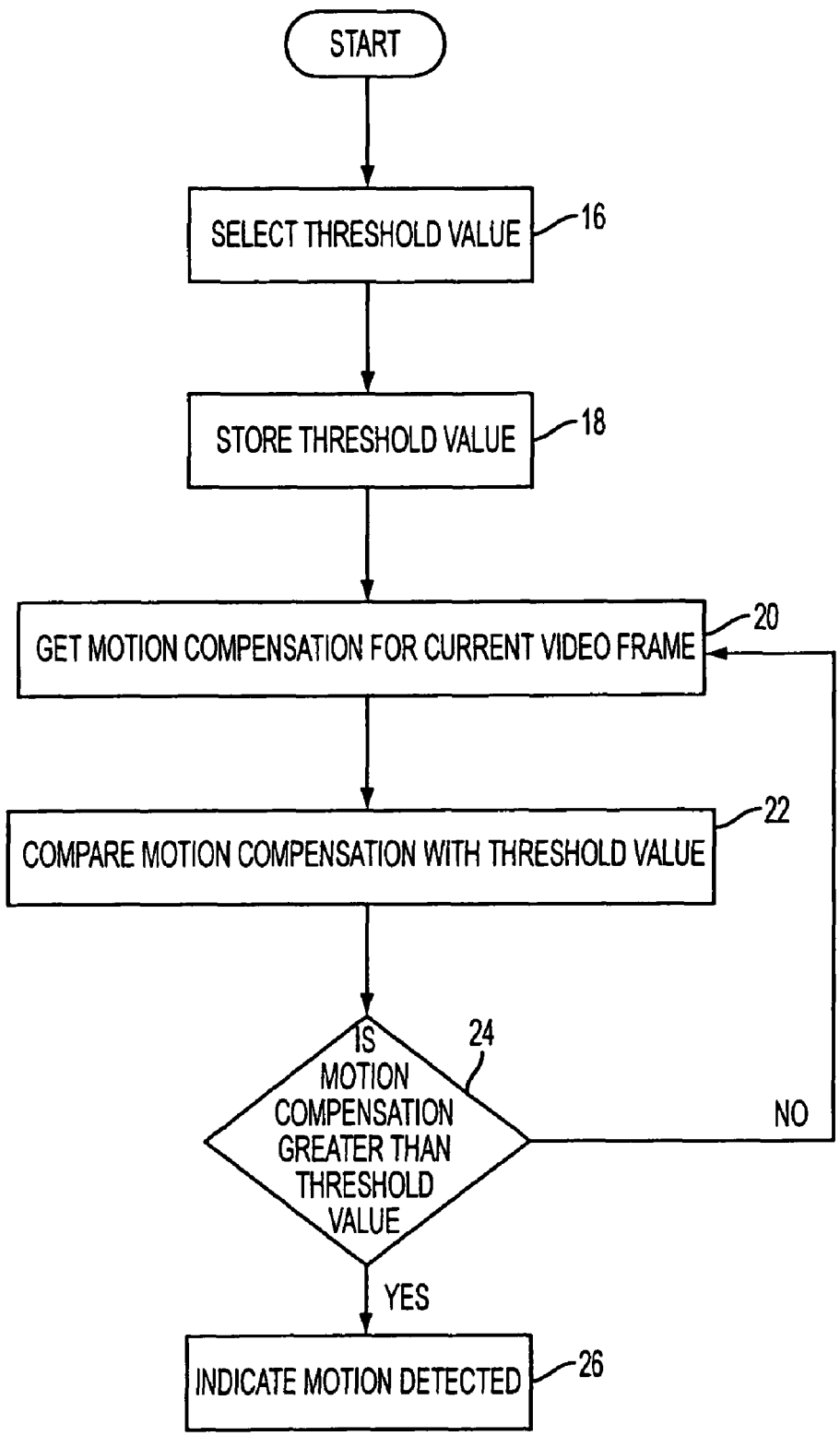
FIG. 2 is a flow chart illustrating a method of implementing the present invention.

Referring to FIG. 2, a flowchart for one method of implementing the present invention is shown. This flowchart could be implemented in processing unit 14 in FIG. 1. At block 16 a threshold value is chosen; this threshold determines the sensitivity of the system to a detected change in the motion compensation component of the compressed video signal from encoder 14. The motion compensation component can be the motion vector in the MPEG standard bitstream, or the motion vector or the sum of the absolute values of the distortion between the two frames stored in the meta-data in a modified MPEG encoder chip as described above. This threshold value is then stored in memory for future reference. At block 20, processing unit 14 gets the motion compensation for the current video frame and compares the motion compensation to the threshold value at block 22. Processing unit14 then determines, at decision point 24, whether the motion compensation is greater than the threshold value. If the motion compensation for the current video frame is not greater than the threshold value, then processing unit 14 returns to block 20 to get the motion compensation for the next current video frame. If the motion compensation for the current video frame is greater than the threshold value, then at block 26 processing unit 14 indicates that motion has been detected. This indication can then be used to sound an alarm, start a video recorder or other appropriate action.

Figure 3:
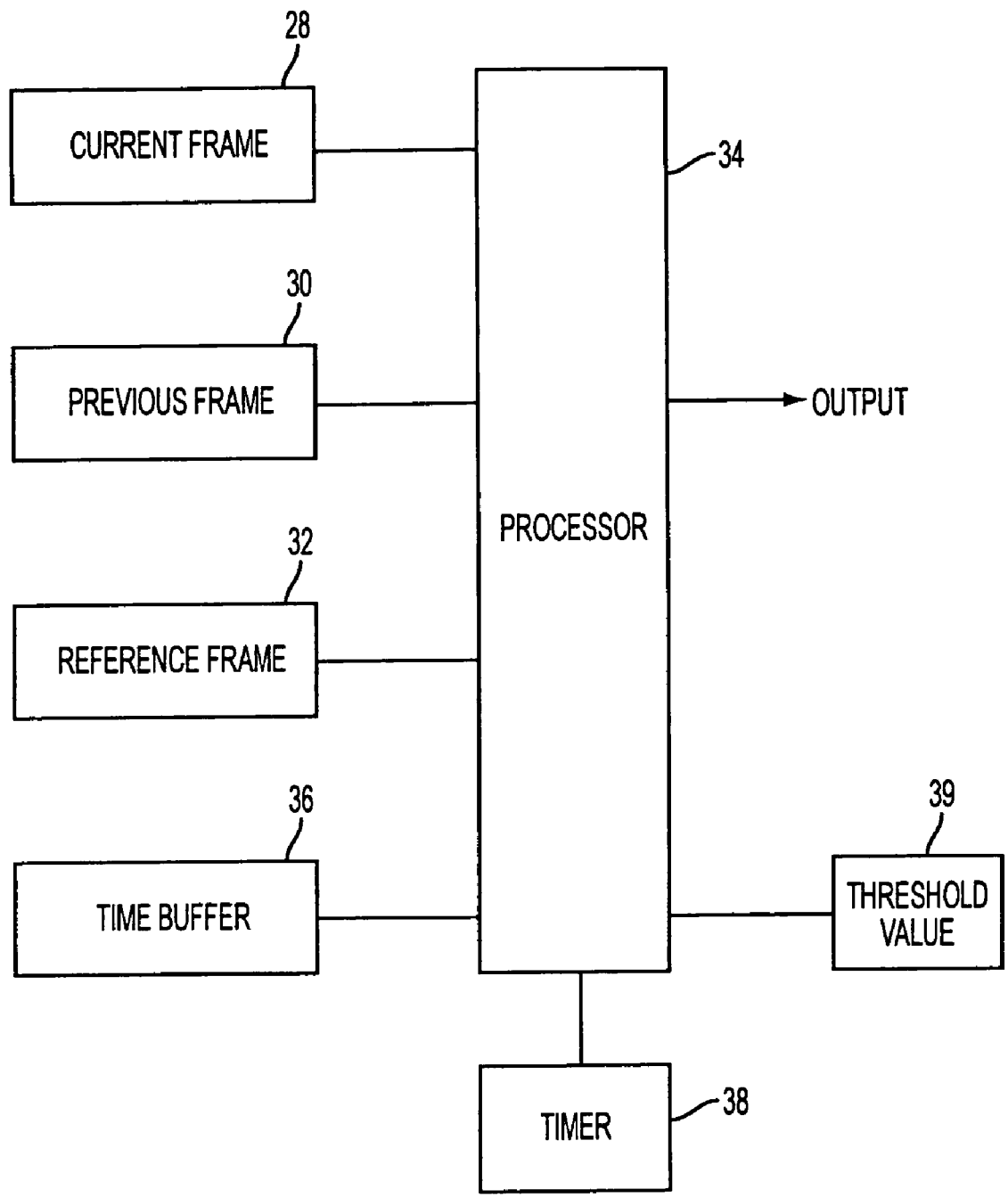
FIG. 3 is a block diagram illustrating another embodiment of the present invention.

FIG. 3 illustrates another embodiment of the present invention in which an additional memory or buffer is added to a standard MPEG encoder chip to provide additional functionality to detect an abandoned object or the removal of an object that is being monitored. A current frame buffer 28, previous frame buffer 30, and reference frame buffer 32 are connected to processor 34, which provides an MPEG compliant compressed video signal on its output. In addition, a time buffer 36 is shown for storing an input from the user indicating the predetermined length of time that an object has to be present in order to be indicated as abandoned or that an object that is being monitored has to be missing in order to be indicated as having been removed. A separate timer 38 is shown for clarity for monitoring the time; however, this can be implemented within processor 34 or by other suitable means. A threshold value buffer 39 is also connected to processor 34 for receiving the desired system sensitivity from a user.

Figure 4:
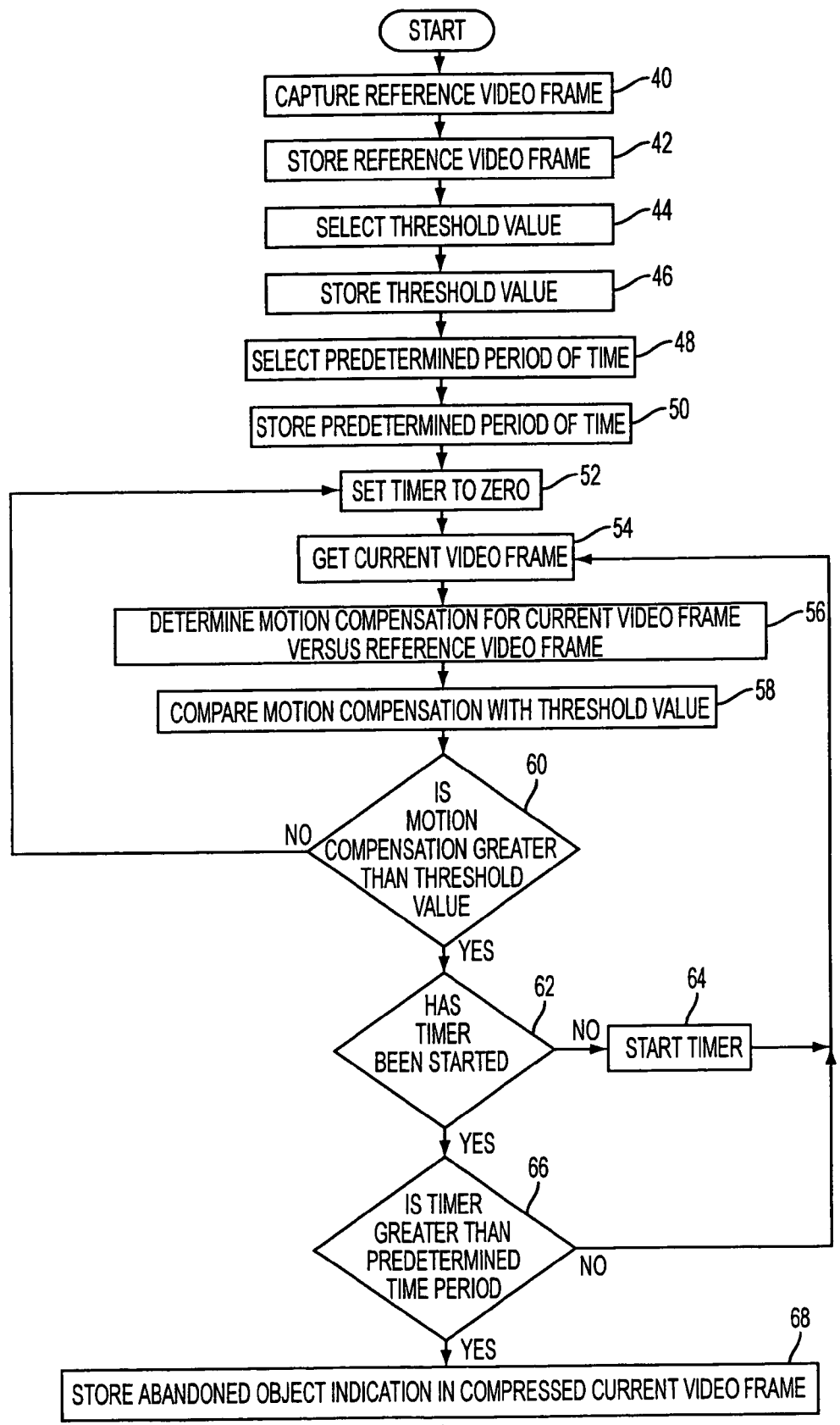
FIG. 4 is a flow chart illustrating a method of implementing the present invention.

Referring to FIGS. 3 and 4, a method of implementing the detection of an abandoned object is disclosed. At block 40, a reference video frame is captured with only the intended objects in it, that is, only the normally expected background and other elements. In block 42, this reference video frame is stored in reference buffer 32. The threshold value or sensitivity is selected by the user at block 44 and stored at block 46. The user then selects the predetermined period of time at block 48, and at block 50 this predetermined period of time is stored in time buffer 36. Timer 38 is set to zero at block 52 by processor 34. Then at block 54, processor 34 gets the current video frame from current frame buffer 28. Processor 34 then at block 58 determines the motion compensation for the current video frame versus the reference video frame in reference buffer 32 at block and compares the motion compensation with the threshold value from threshold value buffer 39. As discussed above, the motion compensation can be the motion vector or the sum of the absolute values of the distortion between the frames. At decision point 60, processor 34 determines if the motion compensation is greater than the threshold value. If the motion compensation is not greater than the threshold value, processor 34 returns to block 52 and sets timer 38 to zero. If the motion compensation is greater than the threshold value, processor 34 proceeds to decision point 62 to determine if timer 38 has been started. If timer 38 has not been started, then at block 64 processor 34 starts timer 38 and then returns to block 54 to get the next current video frame. If timer 38 has been started, then at decision point 66, processor 34 determines if the time on timer 38 is greater than the predetermined time stored in time buffer 36. If the time on timer 38 is not greater than the predetermined time, then processor 34 returns to block 54 to get the next current video frame. If the time on timer 38 is greater than the predetermined time, then processor 34 proceeds to block 68 and stores an indication that an abandoned object has been detected in the compressed current frame. The indication can be stored for example in the meta-data portion of the syntax.

Figure 5:
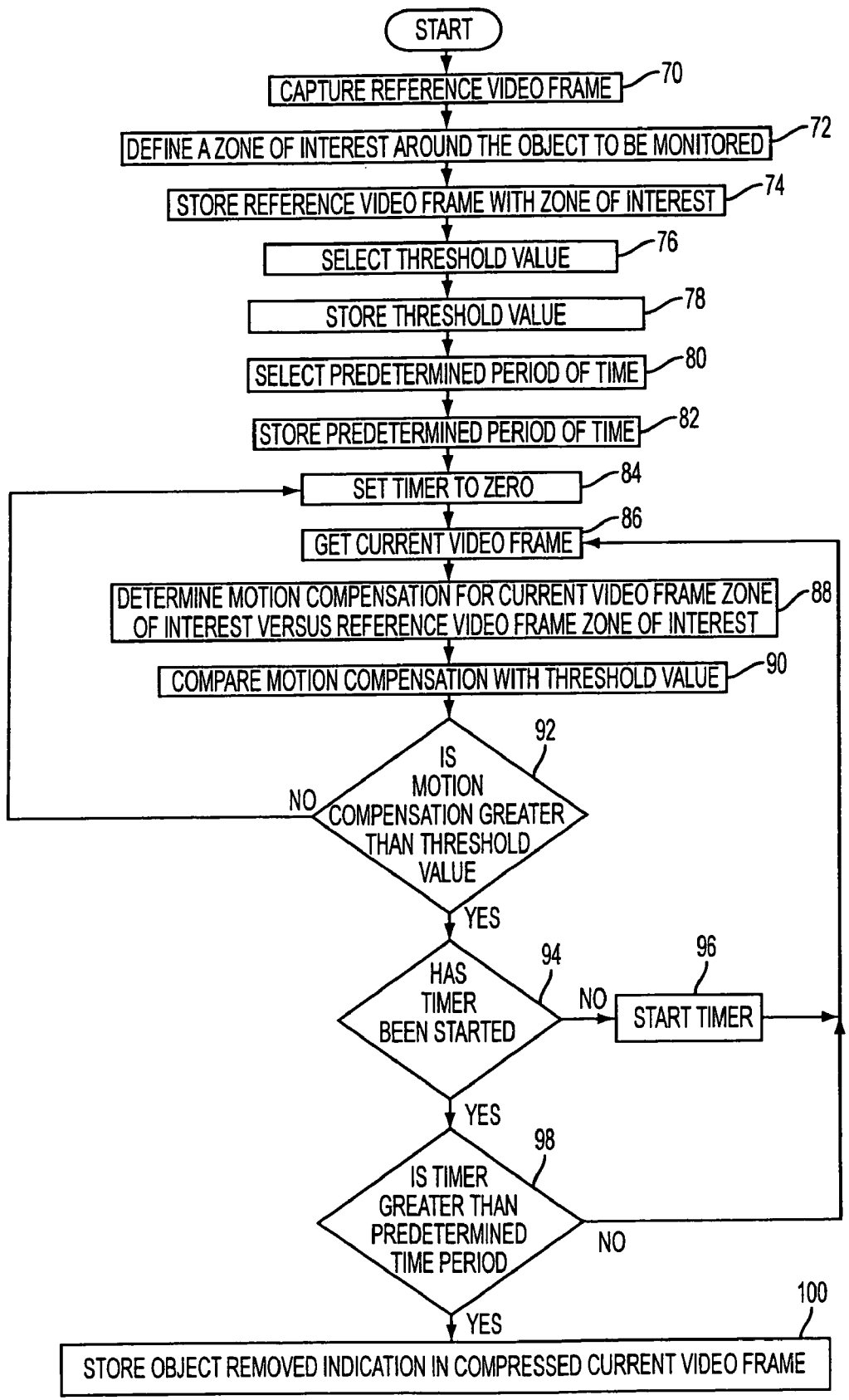
FIG. 5 is a flow chart illustrating a method of implementing the present invention.

Similarly in FIG. 5, a method of detecting if an object has been removed is shown. At block 70, a reference frame with the object to be monitored is captured, and at block 72 a zone of interest around the object to be monitored is defined by the user. At block 74, the reference video frame and the zone of interest are stored in reference frame buffer 32. The threshold value is selected at block 76 and stored at block 78. At blocks 80 and 82, the predetermined period of time is selected and stored respectively. Processor 34 sets timer 38 to zero at block 84 and gets the current video frame at block 86. At block 88, processor 34 determines the motion compensation for the current video frame at the zone of interest verses the reference video frame zone of interest. Processor 34 then compares the motion compensation with the threshold value at block and determines if the motion compensation is greater that the threshold value at decision point 92. If the motion compensation is not greater than the threshold value, then processor 34 returns to block 84 and sets timer 38 to zero. If the motion compensation is greater that the threshold value, then processor 34 proceeds to decision point 94 to determine if timer 38 has been started. If timer 38 has not been started, then it is started at block 96, and processor 34 returns to block 86 to get the next current video frame. If timer 38 has been started, then at decision point 98 processor 34 determines if the time on timer 38 is greater than the predetermined time period. If the time is not greater than the predetermined time period, then processor 34 proceeds back to block 86 to get the next current video frame. If the time is greater that the predetermined time period, then processor 34 proceeds to block 100 and stores an indication that the removal of the monitored object has been detected in the compressed current frame. The indication can be stored for example in the meta-data portion of the syntax.

The reference frame is provided so that one block distortion computation is done for each block. The number of block distortion computations in video compression depends on the search range. For example, a search range is from −7 to 8 for both horizontal and vertical directions. The number of block distortion computations for each block is 16×16 or 256. The increase of computation is very small and is less than 0.5% for this example.

The computational steps involved for the reference frame in addition to the steps for motion compensation are set forth below.

Assume:
  (16×16) is the block size,
  The search range is from −7 to 8 for both horizontal and vertical directions.
  Block(m,n) from a frame $P=\{p(i,j)|m<i\leq m+16$ and $n<j\leq n+16\}$,
  where $p(i,j)$ is the pixel intensity value for the pixel at the $(i,j)$ position.
  I and J are the number of blocks in the horizontal and vertical directions.

Motion compensation can be described as follows:
  For i=0 to I−1
  For j=0 to J−1
    m=16*i
    n=16*j
    A=block (m,n) from the current frame,
    For s1=−7 to 8
      For s2=−7 to 8
        B=block (m+s1, n+s2) from the previous frame $$Dist = \sum_{k=1}^{256} |A_k - B_k|$$

if (Dist<MinDist)

MinDist=Dist

Mx=m+s1

My=n+s2 block (Mx,My) from the previous frame is the best match block for block (m,n) in the current frame.

The extra computation required for achieving the abandoned object or missing object detection is as follows:

For I=0 to I−1
For j=0 to J−1
  m=16*i
  n=16*j
  A=block (m,n) from the current frame,
  B=block (m,n) from the reference frame, $$Dist(i, j) = \sum_{k=1}^{256} |A_k - B_k|,$$

if Dist(i,j)>threshold, motion detected in block (m,n).

The foregoing methods have been described in terms of a motion vector or sum of the absolute values of distortion between the frames for an entire frame; however, the methods can be used with only portions of the frames, that is, only a portion of the blocks into which the frame has been partitioned. As used herein, the term frame should be understood as referring to an entire frame or a portion of the frame. Choosing only a portion of the frame enhances the performance of the methods, for example, in detecting an abandoned object or the removal of a monitored object.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of detecting an abandoned object in a video image comprising the steps of: connecting an MPEG compliant encoder to a video source that provides video images; storing a reference video frame; obtaining the current video image frame; determining the motion compensation for the current video image frame versus the reference video frame; comparing the motion compensation to a threshold value; compressing the current video image; storing an indication in the compressed video image that an abandoned object has been detected if the motion compensation is greater than the threshold value; starting a timer when the motion compensation is greater than the threshold value; continuing to increment the timer for each current video frame that has a motion compensation greater than the threshold value; resetting the timer if a current video frame has a motion compensation less than the threshold value; comparing the timer to a predetermined period of time; and indicating that an abandoned object has been detected if the timer is greater than the predetermined period of time.

2. A method of detecting the removal of an object in a video image comprising the steps of: connecting an MPEG compliant encoder to a video source that provides video images; storing a reference video frame containing an object to be monitored; defining a zone of interest around the object to be monitored; obtaining the current video image frame; determining the motion compensation for the current video image frame in the zone of interest versus the reference video frame zone of interest; comparing the motion compensation to a threshold value; compressing the current video image; storing an indication in the compressed video image that the removal of the object to be monitored has been detected if the motion compensation is greater than the threshold value; starting a timer when the motion compensation is greater than the threshold value; continuing to increment the timer for each current video frame that has a motion compensation greater than the threshold value; resetting the timer if a current video frame has a motion compensation less than the threshold value; comparing the timer to a predetermined period of time; and indicating that the removal of the object to be monitored has been detected if the timer is greater than the predetermined period of time.

3. An apparatus for detecting an abandoned object in a video image comprising: an encoder adapted to be connected to a video image source, said encoder providing compressed video images including an MPEG compliant motion compensation between two video images and comprising a first memory for storing the current video image frame and a processor; a second memory for storing a reference video image; said processor determining the motion compensation for the current video image stored in said first memory with the reference video image stored in said second memory, comparing said motion compensation with a threshold value, and providing an indication in the compressed image for the current frame that an abandoned object has been detected if the motion compensation is greater than the threshold value; a timer and wherein said processor is adapted to start said timer when the motion compensation is greater that the threshold value, to allow the timer to continue to increase provided that the motion compensation for each subsequent current video image has a motion compensation greater than the threshold value and to compare the timer to a predetermined time, and to provide an indication in the compressed image for the current frame that an abandoned object has been detected if the timer is greater than the predetermined time.

4. An apparatus for detecting the removal of an object in a video image comprising: an encoder adapted to be connected to a video image source, said encoder providing compressed video images including an MPEG compliant motion compensation between two video images and comprising a first memory for storing the current video image frame and a processor; a second memory for storing a reference video image containing an object to be monitored; said processor being adapted to allow a zone of interest to be defined around the object in the reference image and determining the motion compensation for the zone of interest in the current video image stored in said first memory with the zone of interest in the reference video image stored in said second memory, comparing said motion compensation with a threshold value, and providing an indication in the compressed image for the current frame that the removal of the object has been detected if the motion compensation is greater than the threshold value; a timer and wherein said processor is adapted to start said timer when the motion compensation is greater that the threshold value, to allow the timer to continue to increase provided that the motion compensation for each subsequent current video image has a motion compensation greater than the threshold value and to compare the timer to a predetermined time, and to provide an indication in the compressed image for the current frame that the removal of the object has been detected if the timer is greater than the predetermined time.

5. An apparatus as recited in claim 3 wherein said motion compensation is a motion vector.

6. An apparatus as recited in claim 3 wherein said motion compensation is a sum of the absolute values of the distortion between the frames.

7. An apparatus as recited in claim 4 wherein said motion compensation is a motion vector.

8. An apparatus as recited in claim 4 wherein said motion compensation is a sum of the absolute values of the distortion between the frames.

* * * * *